(12) United States Patent
Yuyama

(10) Patent No.: US 7,551,207 B2
(45) Date of Patent: Jun. 23, 2009

(54) IMAGE PICKUP APPARATUS, WHITE BALANCE CONTROL METHOD, AND WHITE BALANCE CONTROL PROGRAM

(75) Inventor: Masami Yuyama, Ome (JP)

(73) Assignee: Casio Computer Co., Ltd., Tokyo (JP)

(*) Notice: Subject to any disclaimer, the term of this patent is extended or adjusted under 35 U.S.C. 154(b) by 804 days.

(21) Appl. No.: 10/925,206

(22) Filed: Aug. 24, 2004

(65) Prior Publication Data
US 2005/0047771 A1 Mar. 3, 2005

(30) Foreign Application Priority Data
Aug. 26, 2003 (JP) .............................. 2003-300705

(51) Int. Cl.
H04N 9/73 (2006.01)
H04N 5/235 (2006.01)
H04N 5/225 (2006.01)

(52) U.S. Cl. .............. 348/223.1; 348/224.1; 348/229.1; 348/362; 348/371

(58) Field of Classification Search .............. 348/223.1, 348/224.1, 225.1, 371, 229.1, 362
See application file for complete search history.

(56) References Cited

U.S. PATENT DOCUMENTS

| 4,584,598 | A | | 4/1986 | Kutaragi | |
|---|---|---|---|---|---|
| 4,679,066 | A | | 7/1987 | Masunaga | |
| 4,899,212 | A | * | 2/1990 | Kaneko et al. ............. | 348/227.1 |
| 5,223,921 | A | * | 6/1993 | Haruki et al. ............. | 348/223.1 |
| 5,335,072 | A | * | 8/1994 | Tanaka et al. ............. | 348/231.3 |
| 5,617,139 | A | | 4/1997 | Okino | |
| 6,160,593 | A | | 12/2000 | Nakakuki | |
| 6,181,374 | B1 | * | 1/2001 | Saito et al. ................ | 348/223.1 |
| 6,529,235 | B1 | * | 3/2003 | Tseng ...................... | 348/225.1 |
| 6,621,519 | B2 | * | 9/2003 | Nakayama et al. ......... | 348/223.1 |
| 6,670,987 | B1 | * | 12/2003 | Taura ....................... | 348/223.1 |
| 6,727,942 | B1 | * | 4/2004 | Miyano .................... | 348/223.1 |

(Continued)

FOREIGN PATENT DOCUMENTS

CN    1402530 A    3/2003

(Continued)

OTHER PUBLICATIONS

Chinese Office Action (and English translation thereof) dated Aug. 8, 2008, issued in a counterpart Chinese Application.

*Primary Examiner*—Nhan T Tran
(74) *Attorney, Agent, or Firm*—Frishauf, Holtz, Goodman & Chick, P.C.

(57) ABSTRACT

An electronic still camera has first and second gain controller circuits and a gain storage memory. The gain storage memory includes a first gain table for storing gains for an R amplifier and a B amplifier of the first gain controller circuit; and a second gain table for storing gains for an R amplifier and a B amplifier of the second gain controller circuit, during auto white balance control using light emission of a strobe. The gains of the second gain table are sequentially set to the second gain controller circuit to carry out white detection. Based on a result of the detection, a gain to be set to the first gain controller circuit is selected from the first gain table, and the selected gain is set to the first gain controller circuit.

9 Claims, 9 Drawing Sheets

U.S. PATENT DOCUMENTS

| | | |
|---|---|---|
| 6,982,753 B1 * | 1/2006 | Udagawa ................ 348/222.1 |
| 7,009,639 B1 * | 3/2006 | Une et al. ............... 348/229.1 |
| 7,098,945 B1 | 8/2006 | Sasai et al. |
| 7,184,079 B2 | 2/2007 | Hoshuyama |
| 7,184,080 B2 | 2/2007 | Kehtarnavaz et al. |
| 2003/0030730 A1 * | 2/2003 | Nakayama ............... 348/223.1 |
| 2003/0231248 A1 * | 12/2003 | Yuyama et al. .......... 348/229.1 |

FOREIGN PATENT DOCUMENTS

| | | |
|---|---|---|
| EP | 0 862 335 A2 | 9/1998 |
| EP | 1 045 594 A2 | 10/2000 |
| JP | 04-070179 A | 3/1992 |
| JP | 07-245764 A | 9/1995 |
| JP | 10-150671 | 6/1998 |
| JP | 11-262029 | 9/1999 |
| JP | 2000-299876 A | 10/2000 |
| JP | 2000-308069 | 11/2000 |
| JP | 2001-359116 | 12/2001 |
| JP | 2002-1188757 A | 4/2002 |
| JP | 2003-061102 A | 2/2003 |

* cited by examiner

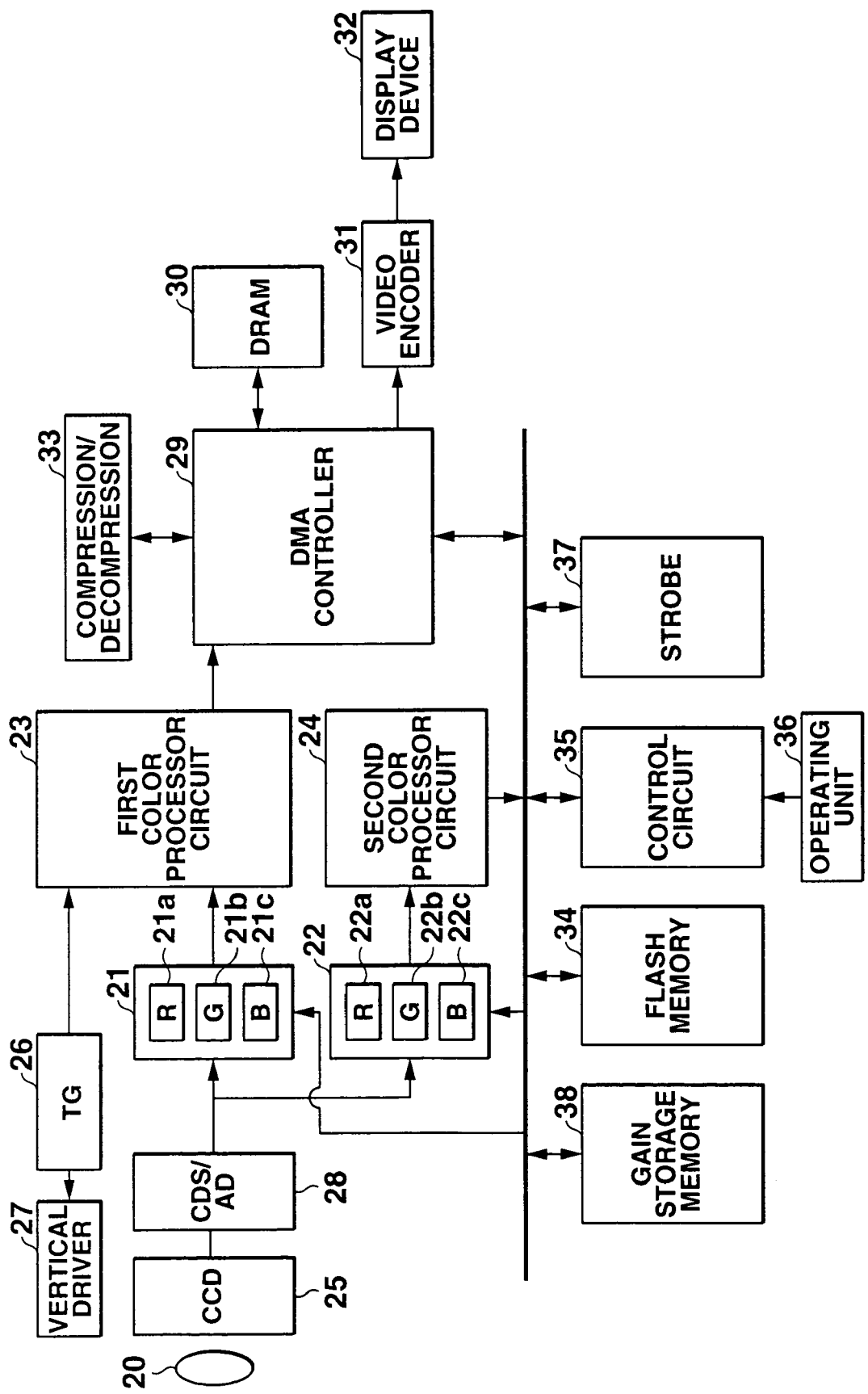

| LIGHT SOURCE | No. | R GAIN | B GAIN |
|---|---|---|---|
| SHADE | (1) | 150 | 61 |
| SUN LIGHT | (2) | 129 | 72 |
| FLUORESCENT LIGHT | (3) | 115 | 124 |
| CANDESCENT LIGHT | (4) | 91 | 130 |

|  | EV2 OR LESS | EV3 TO EV4 | EV5 OR MORE |
|---|---|---|---|
| CANDESCENT LIGHT | D | A1 | A2 |
| FLUORESCENT LIGHT | D | B1 | B2 |
| SHADE | D | C1 | C2 |
| SUN LIGHT | D | D | D |

383

|  | R GAIN | B GAIN |
|---|---|---|
| A1 | 115 | 112 |
| A2 | 103 | 92 |
| B1 | 125 | 106 |
| B2 | 120 | 89 |
| C1 | 138 | 68 |
| C2 | 145 | 64 |
| D | 129 | 72 |

384

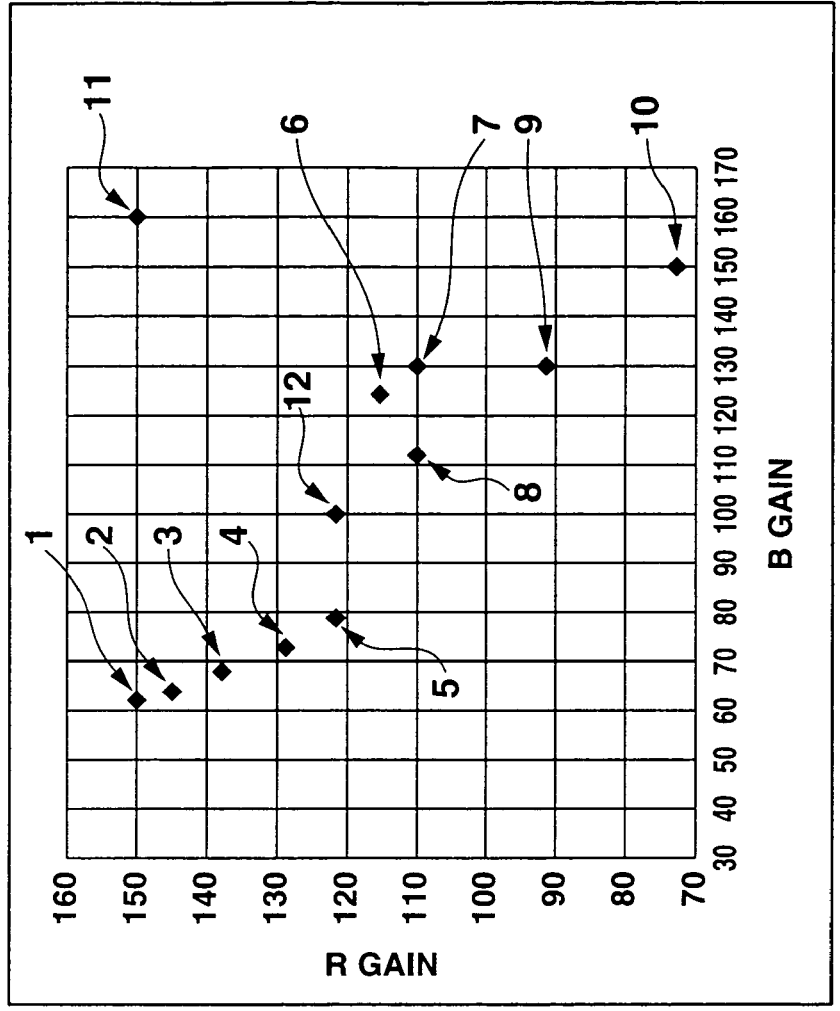

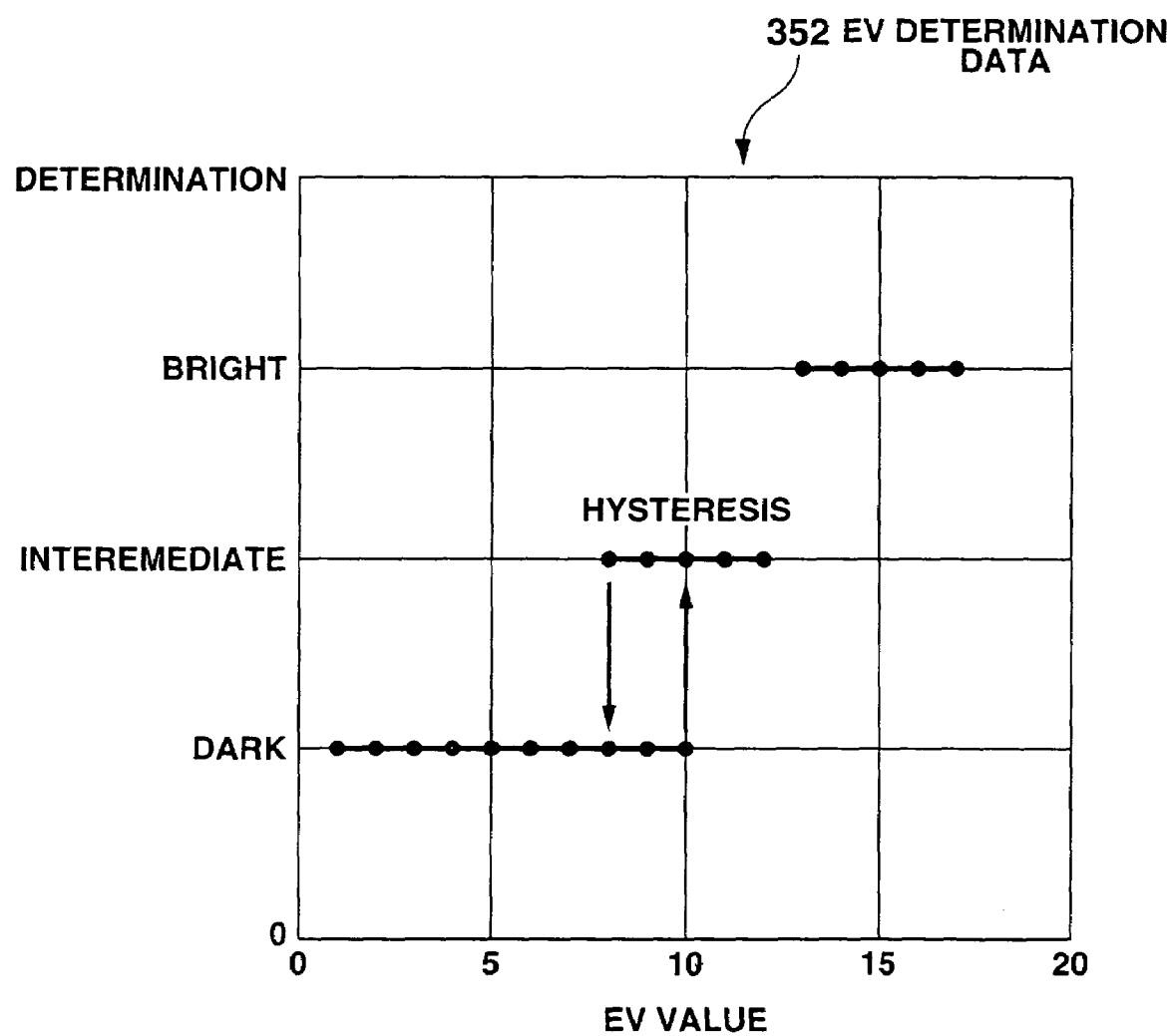

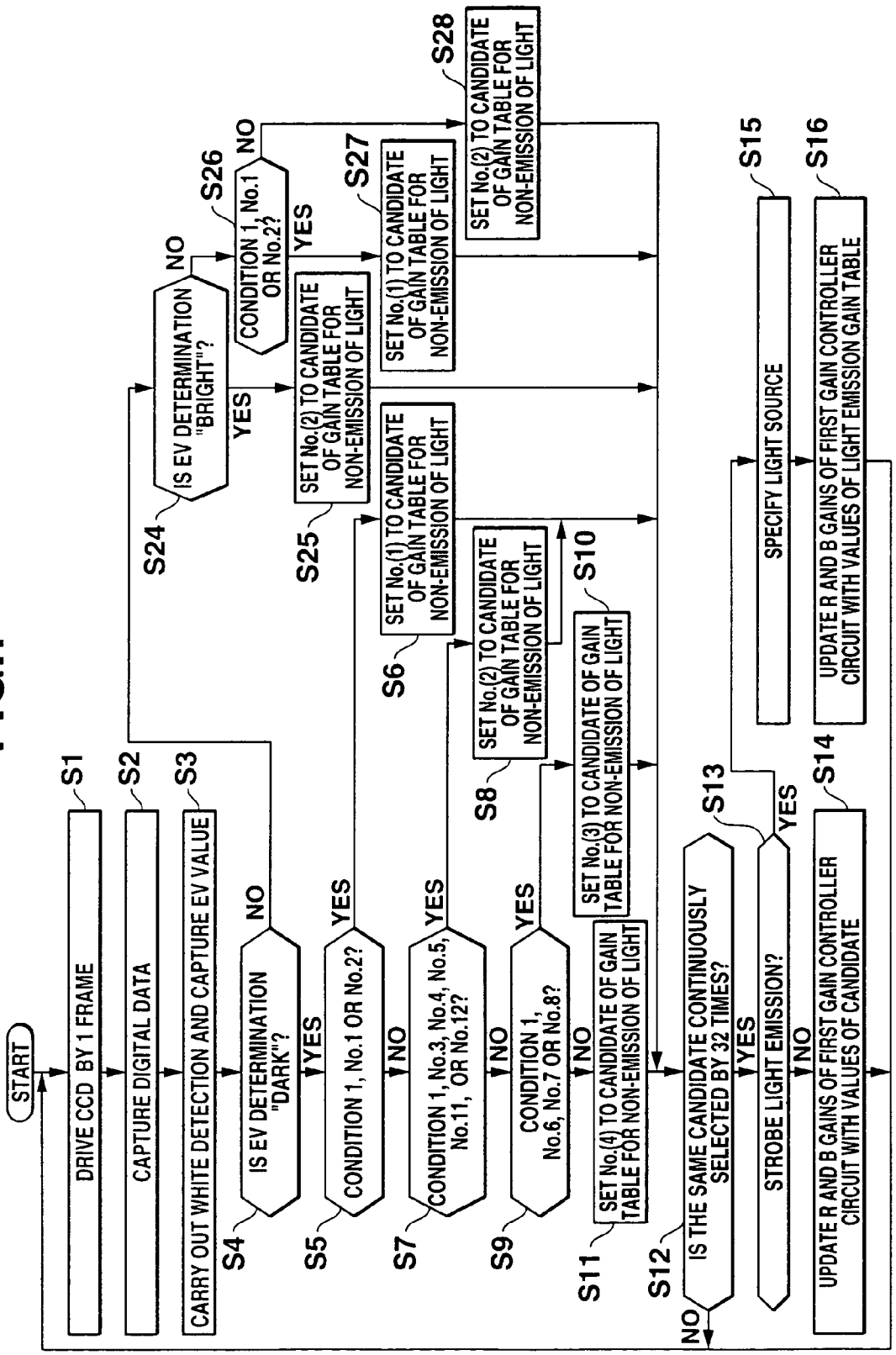

FIG. 8

| FRAME | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| No. OF GAIN SET TO AMPLIFIER #2 | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| NUMBER OF WHITE PIXELS | 0 | 0 | 0 | 0 | 0 | 10 | 100 | 10 | 0 | 0 | 0 | 0 | 0 | 0 | 0 | 0 | 0 | 20 | 120 | 10 | 0 | 0 | 0 | 0 |
| No. OF VARIABLE GAIN TABLE WHICH INCLUDES THE MAXIMUM NUMBER OF WHITE PIXELS | | | | | | 6 | 7 | | | | | | | | | | | 7 | 7 | | | | | |
| EV DETERMINATION | DARK | DARK | DARK | DARK | DARK | DARK | DARK | DARK | DARK | DARK | | | | | | | | DARK | DARK | DARK | DARK | DARK | DARK | DARK |
| CANDIDATE | (2) | (2) | (2) | (2) | (2) | (2) | (2) | (2) | (2) | (2) | | | (3) | (3) | (3) | (3) | (3) | (3) | (3) | (3) | (3) | (3) | (3) | (3) |
| No. OF GAIN SET TO AMPLIFIER #1 | (2) | (2) | (2) | (2) | (2) | (2) | (2) | (2) | (2) | (2) | | | (2) | (2) | (2) | (2) | (2) | (2) | (2) | (2) | (2) | (2) | (2) | (2) |

INITIAL VALUE ← ; A →

| FRAME | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|---|---|---|
| No. OF GAIN SET TO AMPLIFIER #2 | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| NUMBER OF WHITE PIXELS | 0 | 0 | 10 | 100 | 0 | 30 | 150 | 0 | 0 | 0 | 0 | 0 | 0 | 0 | 0 | 0 | 0 | 20 | 200 | 10 | 0 | 0 | 0 | 100 |
| No. OF VARIABLE GAIN TABLE WHICH INCLUDES THE MAXIMUM NUMBER OF WHITE PIXELS | 7 | 7 | 7 | 7 | 7 | 7 | 6 | 7 | 7 | 7 | 7 | 7 | 7 | 7 | 7 | 7 | 7 | 7 | 7 | 7 | 7 | 7 | 7 | 11 |
| EV DETERMINATION | DARK | DARK | DARK | DARK | DARK | DARK | DARK | DARK | DARK | DARK | DARK | DARK | DARK | DARK | DARK | DARK | DARK | DARK | DARK | DARK | DARK | DARK | DARK | DARK |
| CANDIDATE | (3) | (3) | (3) | (3) | (3) | (3) | (3) | (3) | (3) | (3) | (3) | (3) | (3) | (3) | (3) | (3) | (3) | (3) | (3) | (3) | (3) | (3) | (3) | (3) |
| No. OF GAIN SET TO AMPLIFIER #1 | (2) | (2) | (2) | (2) | (2) | (2) | (2) | (2) | (2) | (2) | (2) | (2) | (2) | (2) | (2) | (2) | (2) | (2) | (2) | (2) | (2) | (2) | (2) | (2) |

B → ; C ←

| FRAME | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|---|---|---|---|---|---|---|
| No. OF GAIN SET TO AMPLIFIER #2 | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| NUMBER OF WHITE PIXELS | 0 | 0 | 10 | 100 | 30 | 30 | 30 | 30 | 0 | 0 | 300 | 200 | 0 | 0 | 0 | 0 | 0 | 20 | 200 | 10 | 0 | 0 | 0 | 0 |
| No. OF VARIABLE GAIN TABLE WHICH INCLUDES THE MAXIMUM NUMBER OF WHITE PIXELS | 11 | 11 | 11 | 11 | 11 | 11 | 11 | 11 | 11 | 11 | 11 | 11 | 11 | 11 | 11 | 11 | 11 | 11 | 11 | 11 | 11 | 11 | 11 | 7 |
| EV DETERMINATION | DARK | DARK | DARK | DARK | DARK | DARK | DARK | DARK | DARK | DARK | DARK | DARK | DARK | DARK | DARK | DARK | DARK | DARK | DARK | DARK | DARK | DARK | DARK | DARK |
| CANDIDATE | (2) | (2) | (2) | (2) | (2) | (2) | (2) | (2) | (2) | (2) | (2) | (2) | (2) | (2) | (2) | (2) | (2) | (2) | (2) | (2) | (2) | (2) | (2) | (2) |
| No. OF GAIN SET TO AMPLIFIER #1 | (3) | (3) | (3) | (3) | (3) | (3) | (3) | (3) | (3) | (3) | (3) | (3) | (3) | (3) | (3) | (3) | (3) | (3) | (3) | (3) | (3) | (3) | (3) | (3) |

| FRAME | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
|---|---|---|---|---|---|---|---|---|---|---|---|---|---|---|---|---|---|---|---|---|---|---|---|---|
| No. OF GAIN SET TO AMPLIFIER #2 | 1 | 2 | 3 | 4 | 5 | 6 | 7 | 8 | 9 | 10 | 11 | 12 | 1 | 2 | 3 | 4 | 5 | 6 | 7 | 8 | 9 | 10 | 11 | 12 |
| NUMBER OF WHITE PIXELS | 0 | 0 | 0 | 0 | 0 | 30 | 150 | 10 | 0 | 0 | 0 | 0 | 0 | 0 | 0 | 0 | 0 | 20 | 200 | 10 | 0 | 0 | 0 | 0 |
| No. OF VARIABLE GAIN TABLE WHICH INCLUDES THE MAXIMUM NUMBER OF WHITE PIXELS | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| EV DETERMINATION | DARK | DARK | DARK | DARK | DARK | DARK | DARK | DARK | DARK | DARK | DARK | DARK | DARK | DARK | DARK | DARK | DARK | DARK | DARK | DARK | DARK | DARK | DARK | DARK |
| CANDIDATE | (2) | (2) | (2) | (2) | (2) | (2) | (2) | (2) | (2) | (2) | (2) | (2) | (2) | (2) | (2) | (2) | (2) | (2) | (2) | (2) | (2) | (2) | (2) | (2) |
| No. OF GAIN SET TO AMPLIFIER #1 | (3) | (3) | (3) | (3) | (3) | (3) | (3) | (3) | (3) | (3) | (3) | (3) | (3) | (3) | (3) | (3) | (3) | (3) | (3) | (3) | (3) | (3) | (3) | (3) |

D →

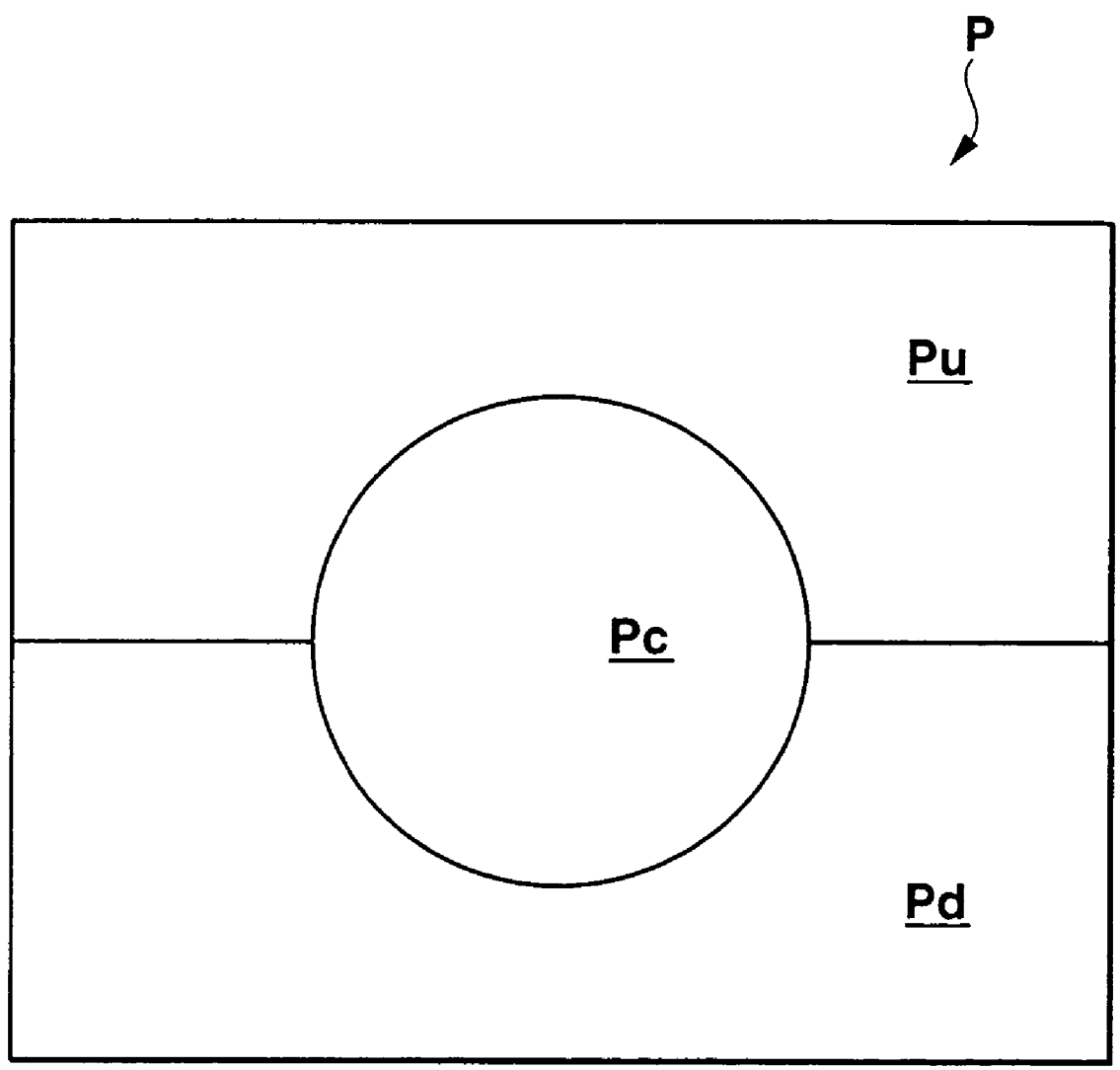

IMAGE PICKUP APPARATUS, WHITE BALANCE CONTROL METHOD, AND WHITE BALANCE CONTROL PROGRAM

CROSS-REFERENCE TO RELATED APPLICATIONS

This application is based upon and claims the benefit of priority from the prior Japanese Patent Application No. 2003-300705, filed Aug. 26, 2003, the entire contents of which are incorporated herein by reference.

BACKGROUND OF THE INVENTION

1. Field of the Invention

The present invention relates to an image pickup apparatus, a white balance control method, and a white balance control program.

2. Description of the Related Art

Conventionally, it has been well known that an electronic still camera which is a type of an image pickup apparatus causes a liquid crystal monitor to display an object image picked up by using a solid state image pickup device such as a CCD as a through image (a finder image) regardless of a shutter operation in an imaging wait state in which a predetermined mode (such as a REC mode) is set. In such an electronic still camera, it is necessary to obtain a white balance in order to reproduce a color of an object more precisely. The white balance is provided to whitely display a white object even when an image is picked up under light with different color temperatures. A gain of an image signal output from the solid state image pickup device is controlled for each of color components R, G, and B according to an imaging environment (a light source), thereby making it possible to allocate the white balance. Therefore, it is possible to obtain a white balance close to an optimal state by storing in a memory a gain value which corresponds to expected plural types of imaging environments (light sources) or a correction coefficient of a reference gain is stored in a memory, and by causing a user to set an actual imaging environment (a light source).

However, this forces the user to make a complicated operation, and thus, an auto white balance function for automatically obtaining a white balance is provided. In order to carry out auto white balance, it is necessary to determine a which portion of the picked-up image is white. In order to determine this white portion, first, an output signal (an image signal) of the solid state image pickup device is YUV-converted, and a color difference signal (a Cb signal, a Cr signal) is obtained. By using this color difference signal, color information, namely, a Cb value and a Cr value are checked relevant to all the pixels configuring an image. At this time, when the Cb value and Cr value of a certain pixel are included in a predetermined white detecting range WS (in a range in which there is a high possibility of being white), it is determined that the color of that pixel is white. The Cb value and Cr value of all the pixels determined to be white are integrated. Then, a gain of an R component and a gain of a B component are controlled so that the integrated value of Cb and the integrated value of Cr are "0" (Cb=Cr=0). That is, in a state in which a white becomes slightly blue (when imaging is carried out under light with a high color temperature), the gain of the R component is increased, and the gain of the B component is reduced. In a state in which white becomes slightly red (when imaging is carried out under light with a low color temperature), the gain of the R component is reduced, and the gain of the B component is increased.

In such a method, when an object appearing to be write under sun light (standard light of 5500 K) is imaged under an imaging condition (imaging light) which is different from another one, a range in which that color (a Cb value, a Cr value) changes is set as a white detecting range WS, whereby, even if the imaging condition (imaging light) is different, a proper white balance can be automatically obtained.

In addition, there has been proposed an auto white balance control method in which, a proper white balance can be automatically obtained while in strobe light emission (refer to, for example, Japanese Patent KOKAI Publication 2000-308069). This auto white balance control method includes comparing object brightness obtained by adding a constant indicative of an increment of object brightness during strobe light emission to the object brightness optically measured before image pickup with object brightness optically measured during strobe light emission imaging. As a result of this comparison, when the object brightness optically measured during strobe light emission is greater, it is determined that type of a light source is strobe light, and a white balance is controlled.

However, in the previously described auto white balance control method, when type of the light source is strobe light, a xenon tube which is a strobe light source has a color temperature of 5500 K which is equal to sun light. Thus, the gain setting of the white balance is performed in the same manner as in the case of sun light. Therefore, there is no problem in the case where no external light exists or in the case where external light is sun light. In a state in which there is any external light other than sun light, and this light hits an object, if strobe light is emitted, the picked-up and recorded image is reproduced as an image with the color of external light because the gain setting of the white balance is performed based on sun light.

BRIEF SUMMARY OF THE INVENTION

The present invention is directed to provide an image pickup apparatus, a white balance control method, and a white balance control program capable of recording an image with a well established white balance even during imaging using light emission.

According to an embodiment of the present invention, An image pickup apparatus comprises:

an image pickup device which picks up an image of an object and outputs an image signal having color components;

a light emitting unit which emits light;

an amplifying unit which amplifies the image signal output from the image pickup device for each color component;

a detecting unit which detects a type of a light source when the light emitting unit does not emit light based on the color components of the image signal;

a setting unit which sets a set of gains for each color component to the amplifying unit according to the type of the light source detected by the detecting unit during imaging when the light emitting unit emits light; and a control unit which supplies the image signal amplified by the amplifying unit to which the set of gains is set by the setting unit to a recording device.

According to another embodiment of the present invention, an image pickup apparatus comprises:

an image pickup device which picks up an image of an object and outputs an image signal having color components;

a light emitting unit which emits light;

a first amplifying unit which amplifies the image signal output from the image pickup device for each color component;

a second amplifying unit which amplifies the image signal output from the image pickup device for each color component;

a set gain storage unit which stores sets of gains of each color component for establishing different white balances during light emission of the light emitting unit;

a varying unit which sequentially varies the set of gains of each color component of the second amplifying unit;

a detecting unit which detects a set of gains having color information included in a predetermined white detection range based on the image signal amplified by the second amplifying unit whose set of gains is varied by the varying unit;

a setting unit which selects a set of gains to be set to the first amplifying unit from the set gain storage unit during imaging when the light emitting unit emits light based on the gain detected by the detecting unit and sets the selected set of gains to the first amplifying unit; and a control unit which supplies the image signal amplified by the first amplifying unit to which the set of gains is set by the setting unit to a recording device.

According to another embodiment of the present invention, a white balance control method in an image pickup apparatus which comprises an image pickup device which picks up an image of an object and outputs an image signal having color components, a light emitting unit which emits light, and an amplifying unit which amplifies the image signal output from the image pickup device for each color component, the method comprises:

detecting a type of a light source when the light emitting unit does not emit light based on the color components of the image signal;

setting a set of gains for each color component to the amplifying unit according to the type of the light source detected by the detecting unit during imaging when the light emitting unit emits light; and supplying the image signal amplified by the amplifying unit to which the set of gains is set by the setting step to a recording device.

According to another embodiment of the present invention, a white balance control method in an image pickup apparatus which comprises an image pickup device which picks up an image of an object and outputs an image signal having color components, a light emitting unit which emits light, a first amplifying unit which amplifies the image signal output from the image pickup device for each color component, a second amplifying unit which amplifies the image signal output from the image pickup device for each color component, and a storage unit which stores sets of gains of each color component for establishing a white balance during light emission of the light emitting unit, the method comprises:

sequentially varying the set of gains of each color component of the second amplifying unit;

detecting a set of gains having color information included in a predetermined white detection range based on the image signal amplified by the second amplifying unit whose set of gains is sequentially varied;

selecting a set of gains to be set to the first amplifying unit from the storage unit during imaging when the light emitting unit emits light based on the detected set of gains and setting the selected set of gains to the first amplifying unit; and supplying the image signal amplified by the first amplifying unit to which the set of gains is set by the setting step to a recording device.

According to another embodiment of the present invention, a white balance control program causing a computer of an image pickup apparatus which comprises an image pickup device which picks up an image of an object and outputs an image signal having color components, a light emitting unit which emits light, and an amplifying unit which amplifies the image signal output from the image pickup device for each color component, the program causes the computer to perform:

detecting a type of a light source when the light emitting unit does not emit light based on the color components of the image signal;

setting a set of gains for each color component to the amplifying unit according to the type of the light source detected by the detecting unit during imaging when the light emitting unit emits light; and supplying the image signal amplified by the amplifying unit to which the set of gains is set by the setting step to a recording device.

According to another embodiment of the present invention, a white balance control program causing a computer of an image pickup apparatus which comprises an image pickup device which picks up an image of an object and outputs an image signal having color components, a light emitting unit which emits light, a first amplifying unit which amplifies the image signal output from the image pickup device for each color component, a second amplifying unit which amplifies the image signal output from the image pickup device for each color component, and a storage unit which stores sets of gains of each color component for establishing a white balance during light emission of the light emitting unit, the program causes the computer to perform:

sequentially varying the set of gains of each color component of the second amplifying unit;

detecting a set of gains having color information included in a predetermined white detection range based on the image signal amplified by the second amplifying unit whose set of gains is sequentially varied;

selecting a set of gains to be set to the first amplifying unit from the storage unit during imaging when the light emitting unit emits light based on the detected set of gains and setting the selected set of gains to the first amplifying unit; and supplying the image signal amplified by the first amplifying unit to which the set of gains is set by the setting step to a recording device.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 1 is a block diagram showing a configuration of an electronic still camera according to an embodiment of the present invention;

FIG. 4A is a view showing a configuration of a variable gain table;

FIG. 4B is a view showing a distribution of gain values of the variable gain table shown in FIG. 4A;

FIG. 6 is a view showing EV determination data;

FIG. 7 is a flow chart showing an operation in a REC through mode in the present embodiment;

FIG. 8 is a view showing a specific example of an operation in the REC through mode in the present embodiment; and FIG. 9 is an illustrative view showing a white detecting method in another embodiment of the present invention.

DETAILED DESCRIPTION OF THE INVENTION

Figures 2A, 2B:
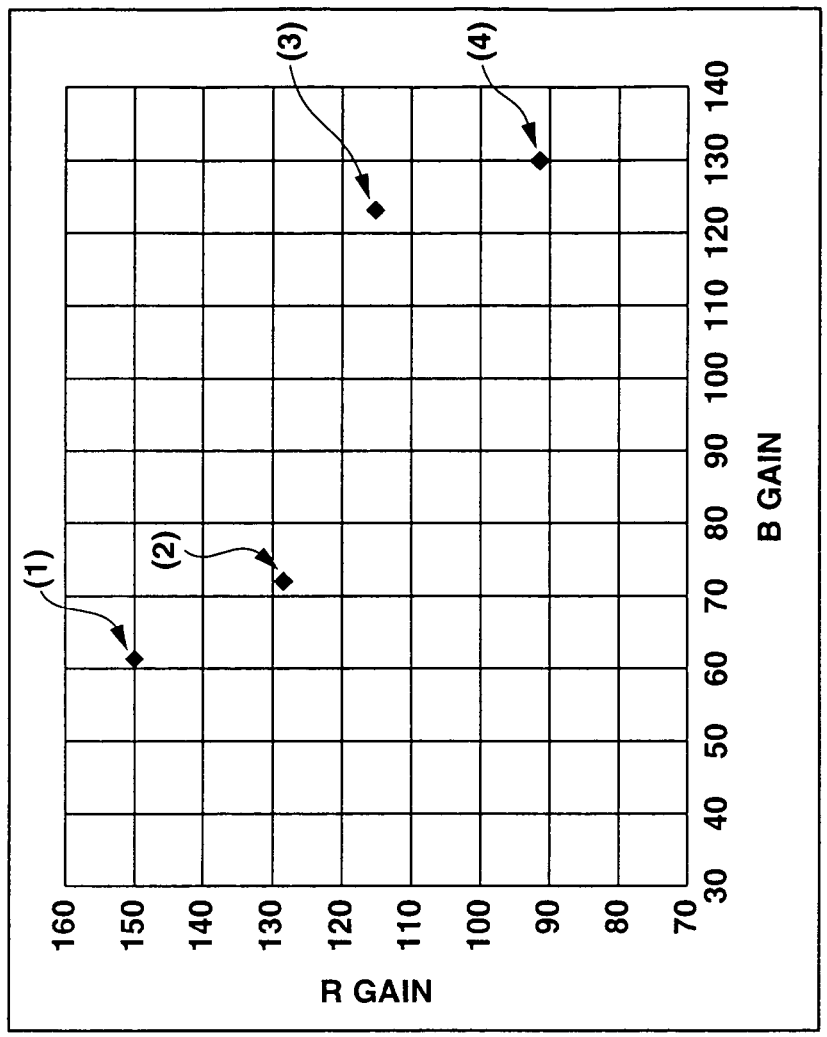
FIG. 2A is a view showing a configuration of a gain table during non-emission of light.
FIG. 2B is a view showing a distribution of gain values of the gain table during non-emission of light shown in FIG. 2A.

An embodiment of the present invention will now be described with reference to the accompanying drawings.

FIG. 1 is a block diagram showing a configuration of an electronic still camera as an embodiment of the present invention. A CCD 25 positioned backwardly of a lens 20 is driven by a timing signal generator 26 and a vertical driver 27. At the CCD 25, a color filter array of the primary colors RGB is provided. An optical image formed on a light receiving surface of the CCD 25 is charge-accumulated at each of R, G, and B light receiving portions, and converted in R, G and B signal charges in an amount according to the light intensity, and the charge-accumulated image is output as an analog image signal to a unit circuit 28. The unit circuit 28 includes a CDS unit for eliminating noise from an input image pickup signal and an A/D converter for converting the noise-eliminated image pickup signal into digital image data. The image data output from the unit circuit 28 is sent to first and second gain controller circuits 21, 22.

The first and second gain controller circuits 21, 22 comprise R amplifiers 21a, 22a, G amplifiers 21b, 22b, and B amplifiers 21c, 22c for color components R, G, and B, respectively, and the gains of the amplifiers 21a, 22a, 21b, 22b, 21c, 22c are controlled by means of a control signal sent from a control circuit 35. An image signal amplified by the first gain controller circuit 21 is sent to a first color processor circuit 23, and a color processing operation is carried out. Then, YUV data including a digital brightness signal (a Y signal) and a color difference signal (a Cb signal, a Cr signal) is written in a buffer of a DMA controller 29. At the same time, R, G, and B image data before the color processing operation are also written in the buffer. The DMA controller 29 transfers the YUV data written in the buffer to a specified region of a DRAM 30, and decompresses the transferred data.

A video encoder 31 generates a video signal based on the YUV data read out from the buffer, and outputs the generated video signal to a display device 32 having an LCD. In this manner, when the REC through mode is set in an image pickup wait state, the picked-up image is displayed as a through image on the display device 32. In addition, in that state, when a shutter key is pressed to instruct imaging, the YUV data for 1 frame written in the buffer is sent to a compressing/decompressing unit 33; compression processing is carried out; and the compressed data is recorded in a flash memory 34. When a PLAY mode for carrying out image reproduction or the like is set, the image data recorded in the flash memory 34 is sent to the compressing/decompressing unit 33 via the DMA controller 29; decompression processing is carried out; and YUV data is reproduced. In this manner, the recorded image is displayed on the display device 32.

On the other hand, the image signal amplified by the second gain controller circuit 22 is sent to a second color processor circuit 24, and a color processing operation is carried out. Then, YUV data including a digital brightness signal (a Y signal) and a color difference signal (a Cd signal, a Cr signal) is sent to the control circuit 35.

The control circuit 35 has a ROM having a program or data stored therein and a work RAM. This control circuit 35 controls an operation of each of the previously described elements according to a predetermined program, and provides functions of the electronic still camera corresponding to a state signal sent from an operating unit 36, i.e., an auto exposure control (AE) or an auto white balance (AWB). A variety of keys such as a shutter key and REC through mode and PLAY mode select keys are provided at the operating unit 36, and a state signal according to key operation is sent to the control circuit 35. A strobe 37 is driven during operation of the shutter key (during imaging) as required, and emits auxiliary light.

A gain storage memory 38 stores a gain set at the R amplifier 21a and B amplifier 21c of the first gain controller circuit 21 and a gain set at the R amplifier 22a and B amplifier 22c of the second gain controller 22 during auto white balance control by the control circuit 35. That is, the gain storage memory 38 stores a gain table 381 for non-emission of light shown in FIG. 2A; gain tables 383 and 384 for the first and second emission of light serving as set gain storage unit shown in FIGS. 3A and 3B; and a variable gain table 382 serving as variable gain storage unit shown in FIG. 4A.

The gain table 381 for non-emission of light shown in FIG. 2A is provided as a table for use in setting gains of the R amplifier 21a and B amplifier 21c of the first gain controller circuit 21 during auto white balance control using the control circuit 35 during non-emission of light which disables light emitting operation of the strobe 37. This table 381 stores the R gain values and the B gain values corresponding to gain No. (1) to gain No. (4). Gain Nos. (1) to (4) represent values of the R gain and the B gain capable of setting a proper white balance during imaging when shade; sun light; fluorescent lamp; and candescent lamp are used as a light source. These R gain values and B gain values consist of empirical values. FIG. 2B is a conceptual view showing a distribution of gain values in the gain table 381 for non-emission of light shown in FIG. 2A.

Figures 3A, 3B, 3C:
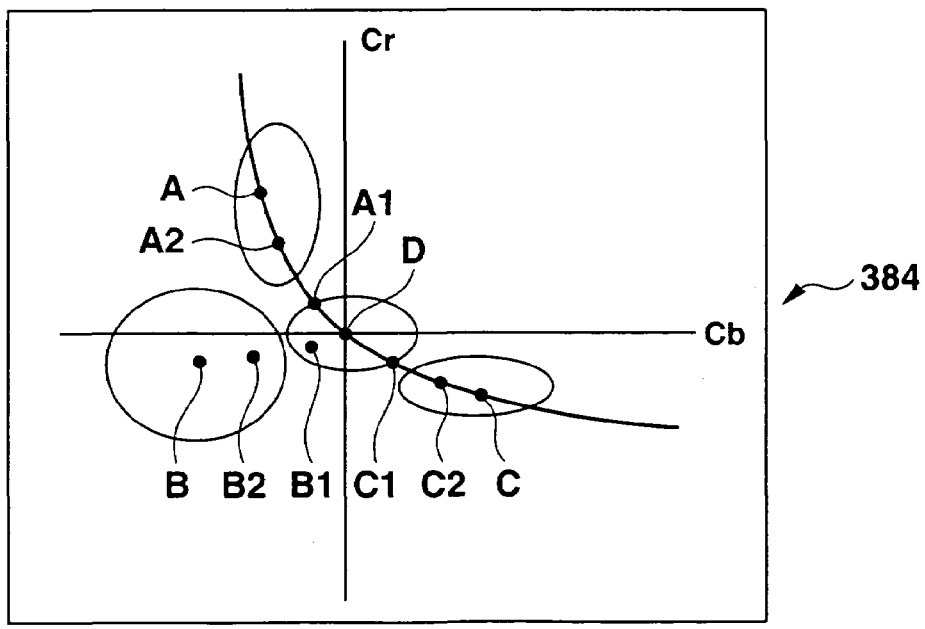
FIG. 3A is a view showing a configuration of a gain table during a first light emission.
FIG. 3B is a view showing a configuration of a gain table during a second light emission.
FIG. 3C is a view showing a distribution of gain values of the gain table during the second light emission shown in FIG. 3B.

The first light emission gain table 383 shown in FIG. 3A is provided for use in setting gains of the R amplifier 21a and B amplifier 21c of the first gain controller circuit 21 during light emission for causing the strobe 37 to make a light emitting operation and during auto white balance control using the control circuit 35. The first light emission gain table 383 stores codes indicating the R gain value and B gain value in the case of "EV (Exposure Value) 2 or less", "EV 3 to 4", and "EV 5 or more" corresponding to a "candescent light", a "fluorescent light", a "shade", and a "sun light" as illustrated. The second light emission gain table 384 specifically and numerically stores values of the R gain and values of the B gain implied by codes A1, A2, B1 ... D stored in the first light emission gain table 383, as shown in FIG. 3B and FIG. 3C.

The variable gain table 382 shown in FIGS. 4A and 4B is provided for use in setting gains of the R amplifier 22a and B amplifier 22c of the second gain controller circuit 22 during auto white balance control using the control circuit 35. This table stores the R gain values and B gain values corresponding to gain Nos. 1 to 12. Gain Nos. 1 to 12 represent values of the R gain and the B gain capable of setting a proper white balance during imaging when shade A; shade B; sun light A; sun light B; sun light C; fluorescent lamp A; fluorescent lamp B; fluorescent lamp C; candescent lamp A; candescent lamp B; green light; and beige light are used as a light source. These R gain and B gain values also consist of empirical values.

FIG. 4B is a conceptual view showing a distribution of gain values in the variable gain table 382 shown in FIG. 4A.

In the gain table 381 for non-emission of light and variable gain table 382, gain No. (1) and gain No. 1; gain No. (2) and gain No. 4; gain No. (3) and gain No. 6; and gain No. (4) and gain No. 9 each represents the same R gain values and B gain values.

Figure 5:
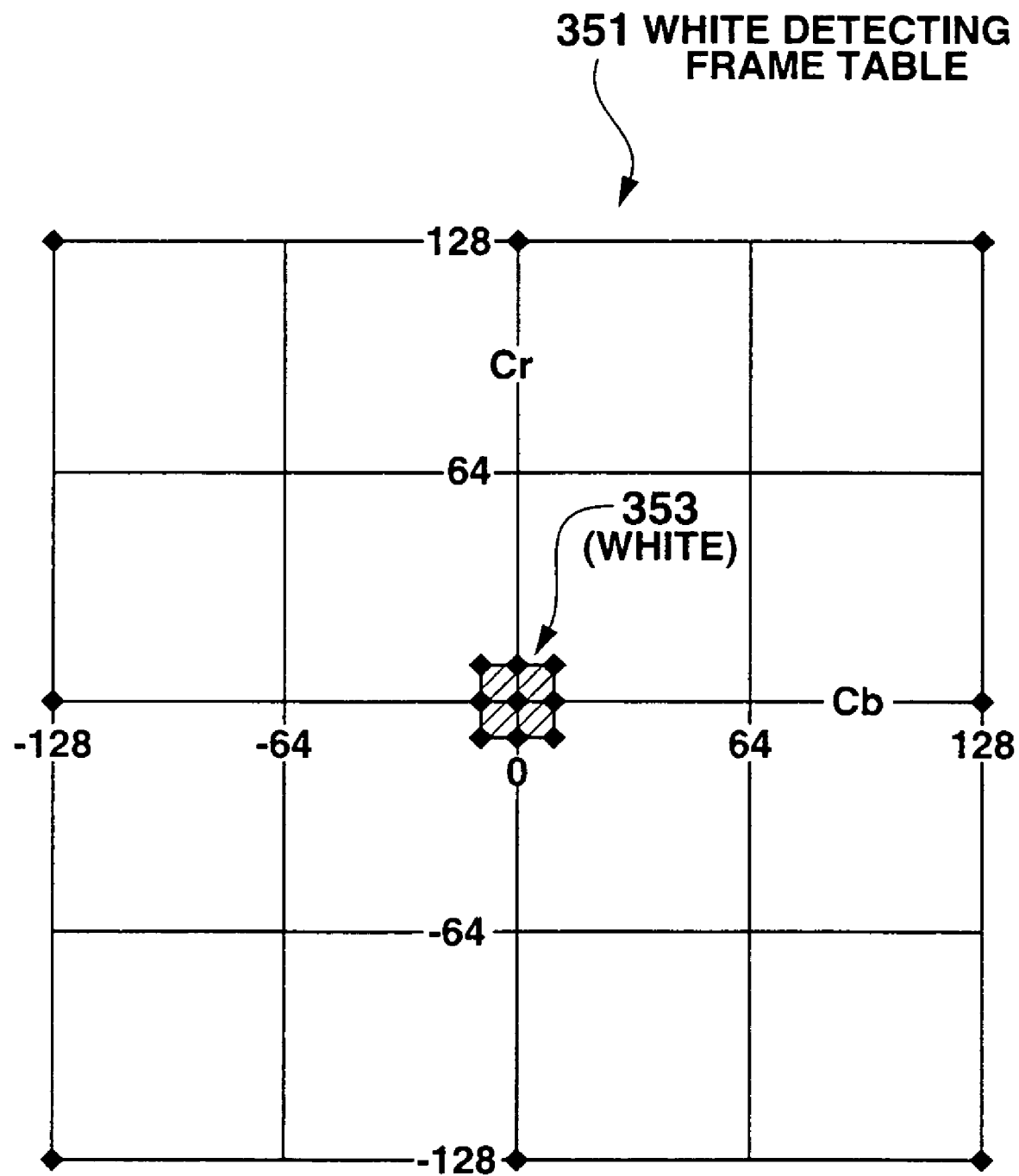
FIG. 5 is a view showing white detecting frame data.

A ROM of the control circuit 35 or the gain storage memory 38 stores white detecting frame data 351 shown in FIG. 5 and EV (Exposure Value) determination data 352 shown in FIG. 6.

Now, an operation in a REC through mode in a state in which an AWB mode has been set in the present embodiment having the above constituent elements will be described with reference to a flow chart shown in FIG. 7.

In the electronic still camera, when the REC through mode is set, the control circuit 35 starts processing operation in accordance with this flow chart based on an associated program. First, the CCD 25 is driven to pickup an image of 1 frame (step S1). Digital data for 1 frame thus obtained is captured (step S2); white detecting frame and EV value are captured (step S3); and EV determination "dark" is executed (step S4).

The processing operation in step S4 is executed based on the EV determination data 352 shown in FIG. 6, and it is determined whether or not the captured EV value is a value which belongs to "dark" of the EV determination data 352. When the captured EV value is a value which belong to "dark" of the EV determination data 352 (step S4: YES), it is assumed that the captured image data is picked-up in any case of imaging under the shade and imaging using sunlight, candescent light or fluorescent light as a light source.

In this case, it is determined whether or not gain No. determined under condition 1 is gain No. 1 or No. 2 of the variable gain table 382 (step S5). The gain No. determined under condition 1 is a gain No. of table in which the number of whites is the maximum from among the last 12 frames (the number of pixels included in a white frame 353 of the white detecting frame data 351 shown in FIG. 5) if gain No. 1 to gain No. 12 of the variable gain table 382 are cyclically set to the R amplifier 22a and B amplifier 22c of the second gain controller circuit 22 on a frame by frame basis.

That is, as shown in a specific example of FIG. 8 (in FIG. 8, the first gain controller circuit 21 is designated by "#1", and the second gain controller circuit 22 is designated by "#2".) In a state in which EV determination is "dark", the gain No. 1 to No. 12 are cyclically set at the R amplifier 22a and B amplifier 22c of the second gain controller circuit 22 (#2) for each of frames 1, 2, 3, ..., "the number of whites" is detected for each frame, and the maximum No. of the last 12 frames is determined. If plural frames show the same maximum number of white pixels, the recent frame is determined.

As a result of the determination in step S5, when the gain of the variable gain table 382 determined under condition 1 is No. 1 or No. 2 (step S5: YES), gain No. (1) for the shade is set to a gain candidate of the gain table 381 for non-emission of light to be set at the R amplifier 21a and B amplifier 21c of the first gain controller circuit 21 (step S6).

As a result of the determination in step S5, when the gain of the variable gain table 382 determined under condition 1 is neither No. 1 nor No. 2 (step S5: NO), it is determined whether or not the gain of the variable gain table 382 determined under condition 1 is No. 3, 4, 5, 11 or 12 (step S7). When the determination in step S7 is YES, gain No. (2) for sun light is set to a gain candidate of the gain table 381 for non-emission of light to be set at the R amplifier 21a and B amplifier 21c of the first gain controller circuit 21 (step S8).

As a result of the determination in step S7, when the gain of the variable gain table 382 determined under condition 1 is not any one of Nos. 3, 4, 5, 11 and 12 (step S7: NO), it is determined whether or not the gain of the variable gain table 382 determined under condition 1 is No. 6, 7 or 8 (step S9). When the determination in step S9 is YES, gain No. (3) for fluorescent light is set to a gain candidate of the gain table 381 for non-emission of light to be set at the R amplifier 21a and B amplifier 21c of the first gain controller circuit 21 (step S10).

That is, in a specific example shown in FIG. 8, in gain Nos. 1, 2, 3, ... 12 set for frames 1, 2, 3, ... 12, a gain No. in which number of whites is the maximum (100) is No. 7. Therefore, the determination in step S9 at the time of frame 13 (time point A) is YES, and No. (3) for fluorescent light is set to a candidate of the gain table 381 for non-emission of light (step S10).

Further, as a result of the determination in step S9, when the gain of the variable gain table 382 determined under condition 1 is not any of Nos. 6, 7 and 8 (step S9: NO), gain No. (4) for fluorescent light is set to a gain candidate of the gain table 381 for non-emission of light to be set at the R amplifier 21a and B amplifier 21c of the first gain. controller circuit 21 (step S11).

On the other hand, as a result of the determination in step S4, when the captured EV value is not a value which belongs to "dark" of the EV determination data 352 (step S4: NO), it is determined whether or not the value belongs to "bright" (step S24). When this EV value is a value which belongs to "bright" of the EV determination data 352 (step S24: YES), it is assumed that the captured image data is picked up when sun light is used as. a light source. Therefore, in this case, as in the previously described step S8, gain No. (2) for sun light is set to a gain candidate of the gain table 381 for non-emission of light to be set at the R amplifier 21a and B amplifier 21c of the first gain controller circuit 21 (step S25).

However, as a result of the determination in step S14, when the captured EV value is not a value which belongs to "bright" of the EV determination data 352 (step S24: NO), as in the previously described step S5, it is determined whether or not the gain of the variable gain table 382 determined under condition 1 is No. 1 or No. 2 (step S26). When the gain of the variable gain table 382 determined under condition 1 is No. 1 or No. 2, (step S26: YES), gain No. (1) for the shade is set to a gain candidate of the gain table 381 for non-emission of light to be set at the R amplifier 21a and B amplifier 21c of the first gain controller circuit 21 (step S28).

However, when the gain of the variable gain table 382 determined in condition 1 is neither No. 1 nor No. 2 (step S26: NO), gain No. (2) for sun light is set to a gain candidate of the gain table 381 for non-emission of light to be set at the R amplifier 21a and B amplifier 21c of the first gain controller circuit 21 (step S28).

Next, it is determined whether or not Nos. defined as candidates in steps S6, S8, S10, S11, S25, S27 and S28 are continuously identical to each other 32 times (step S12). When a negative determination is made (step S12: NO), processing operations from step S1 are repeated. When an affirmative determination is made (step S12: YES), it is determined whether or not the strobe 37 is to be turned on to emit light (step S13).

When it is determined that there is no need for causing the strobe 37 to make a light emission operation during operation of a shutter key (during imaging), or alternatively, when the user sets non-emission of light of the strobe 37 at the operating unit 36 (step S13: NO), the gain values of that No. is set and updated at the R amplifier 21a and B amplifier 21c of the gain controller circuit 21 (step S13).

That is, in a specific example shown in FIG. 8, gain No. (3) defined as a candidate is continuous 32 times at time point B. Therefore, the determination in step S12 is YES at time point B, and gain No. (2) which is an initial value of the R amplifier 21a and B amplifier 21c of the gain controller circuit 21 is updated to gain No. (3). In addition, at time point C as well, gain No. (2) defined as a candidate is continuous 32 times from time point D at which it is assumed that a scene has changed. Therefore, at time point C as well, the determination in step S12 is YES, and gain No. (3) is updated to gain No. (2).

Therefore, the R amplifier 21a and B amplifier 21c of the first gain controller circuit 21 amplify R and B color components of digital image data of an optical image sent from the unit circuit 28 by the gain set in step S14. The amplifying procedure is performed independently from the selection procedure shown in FIG. 7. In addition, as described above, an image signal amplified by the first gain controller circuit 21 is sent to the first color processor circuit 23, and a color processing operation is carried out. Then, YUV data including a digital brightness signal (a Y signal) and a color difference signal (a Cb signal, a Cr signal) is written into a buffer of the DMA controller 29. The DMA controller 29 transfers the YUV data written into the buffer to a specified region of the DRAM 30, and decompresses the transferred data. The video encoder 31 generates a video signal based on the YUV data read out from the buffer, and outputs the generated signal to the display device 32 having an LCD.

In this manner, when the REC through mode is set in an imaging wait state, any complicated operation for setting a white balance according to a light source is not required. During imaging using light emission, an object image with a well established white balance is displayed as a through image on the display device 32. Moreover, a through image is displayed on the display device 32 not based on image data from the second gain controller circuit 22 to which the gain of the variable gain table 382 is set at No. 1 to No. 12 on a frame by frame basis under the condition 1, but based on image data from the second gain controller circuit 22 whose gain is updated and set in step S13. Thus, the white balance of the through image displayed on the display device 32 does not often change.

During imaging instruction supply when a shutter key is pressed, YUV data for 1 frame stored in the buffer is sent to the compressing/decompressing unit 33; compression processing is carried out; and the compressed data is recorded in the flash memory 34. In this manner, image data on an object image whose white balance is well established can be recorded in the flash memory 34.

On the other hand, when it is determined that the control circuit 35 causes the strobe 37 to make a light emitting operation during operation of a shutter key (during imaging), or alternatively, when the user sets forced light emission of the strobe 37 at the operating unit 36 (step S13: YES), a light source is specified (step S15). That is, as described previously, at the time point when the determination in step S12 is YES, any one of gain No. (1) to No. (4) of the gain table for non-emission of light is determined. In the thus determined gain No. (1) to No. (4), as described previously, gain No. (1) is a gain set during imaging under the shade; gain No. (2) is a gain set during imaging under sun light; gain No. (3) is a gain set during imaging under fluorescent light used as a light source; and gain No. (4) is a gain set during imaging under candescent light used as a light source. Therefore, if the determined gain is gain No. (1) when the determination in step S12 is YES, a light source is specified as "shade". If the determined gain is gain No. (2) when the determination in step S12 is YES, a light source is specified as "sun light". If the determined gain is gain No. (3) when the determination in step S12 is YES, a light source is specified as "fluorescent light". If the determined gain is gain No. (4) when the determination in step S12 is YES, a light source is specified as "candescent light".

Next, referring to the light emission gain tables 383 and 384, the gain values during strobe light emission are set and updated at the R amplifier 21a and B amplifier 21c of the first gain controller circuit 21 (step S16).

That is, in accordance with the processing operations of step S15, a light source is specified as any of the "shade", "sun light", "fluorescent light", and "candescent light". In addition, an EV value is captured in accordance with the processing operation in step S3. Therefore, in step S16, first, a code corresponding to the specified light source ("shade", "sun light", "fluorescent light", or "candescent light") and corresponding to the captured EV value is read out from the first light emission gain table 383 shown in FIG. 3A. Further, the R gain value and B gain value corresponding to the code read out from the first light emission gain table 383 are read out from the second light emission gain table 384, and the gain values are set and updated at the R amplifier 21a and B amplifier 21c of the first gain controller circuit 21 (step S16).

That is, in a specific example shown in FIG. 8, gain No. (3) defined for a candidate is continuous 32 times at time point B. Therefore, at time point B, the determination in step S12 is YES, and the "fluorescent light" of a light source for gain No. (3) is specified. At this time, for example, when the EV value is EV 3 to 4, "B1" is read out from the first light emission gain table 383 of FIG. 3A based on the "EV 3 to 4" of the "fluorescent light". In addition, R gain "125" and B gain "106" are read our from the second light emission gain table 384 of FIG. 3B based on the "B1". Therefore, at time point B, the gain value of the R amplifier 21 of the first gain controller circuit 21 is set and updated to "125", and the gain value of the B amplifier 21c is set and updated to "106", respectively.

In addition, at time point C as well, gain No. (2) defined for a candidate is continuous 32 times from time point D at which it is assumed that a scene has changed. Therefore, at time point C, the determination in step S12 is YES, and the "sun light" of a light source for gain No. (2) is specified. At this time, even if any one of EV 2 or less, EV 3 to 4, and EV 5 or more is set, the code of the "sun light" is set to "D" in the first light emission gain table 383 of FIG. 3A. In addition, the code "D" indicates R gain "129" and B gain "72" as shown in the second light emission gain table 384 (FIG. 3B). Therefore, at time point C, the gain value of the R amplifier 21a of the first gain controller circuit 21 is set and updated to "129", and the gain value of the B amplifier 21c is set and updated to "25", respectively.

Therefore, the R amplifier 21a and B amplifier 21c of the first gain controller circuit 21 amplify R and B color components of digital image data of an optical image sent from the unit circuit 28 by the gain set in step S16. In addition, as described previously, an image signal amplified by the first gain controller circuit 21 is sent to the first color processor circuit 23, and a color processing operation is carried out. Then, YUV data including a digital brightness signal (a Y signal) and a color difference signal (a Cb signal, a Cr signal) is written into the buffer of the DMA controller 29. The DMA controller 29 transfers the YUV data written into the buffer to a specified region of the DRAM 30, and decompresses the transferred data. The video encoder 31 generates a video signal based on the YUV data read out from the buffer, and outputs the generated signal to the display device 32.

During imaging instruction supply when the shutter key is pressed, after the strobe 37 has made a light emitting operation, the YUV data for 1 frame stored in the buffer is sent to the compressing/decompressing unit 33; compression processing is carried out; and the compressed data is recorded in the flash memory 34. In this manner, during light emission of the strobe 37, the flash memory 34 can record image data on an object image with a well established white balance considering external light. That is, during light emission of the strobe 37, even in a state in which the "shade", "fluorescent light", or "candescent light" other than "sun light" illuminates an object with external light, the flash memory 34 can record image data of an object image without being affected by any color of external light.

In the present embodiment, white detection is carried out for a whole image for 1 frame by means of the CDD 25. However, as shown in FIG. 9, an image P for 1 frame is divided into three sections, a center portion Pc, an upper portion Pu, and a lower portion Pd. An object is generally allocated at the center portion Pc. Thus, white detection may be carried out by partially detecting an image, for example, by carrying out white detection for only the upper portion Pu and lower portion Pd other than the center portion Pc.

In addition, in the present embodiment, although an EV value itself is used in EV determination, an EV movement average is obtained, whereby the obtained average may be used for EV determination. In this manner, stable determination can be made without depending on a change in an EV value in a short period of time.

Further, although the present embodiment has described as an electronic still camera for, when a shutter key is pressed in a state in which a through image is displayed, recording an image picked up at that time, the present invention can be applied to other apparatuses as long as they make auto white balance control of a picked-up image without being limited to the electronic still camera as described above.

What is claimed is:

1. An image pickup apparatus comprising:
   an image pickup device configured to pick up an image of an object and output an image signal having color components;
   a light emitting unit configured to emit light;
   a first amplifying unit configured to amplify the image signal output from the image pickup device for each color component;
   a detecting unit configured to detect a type of a light source when the light emitting unit does not emit light based on the color components of the image signal;
   a first setting unit configured to set a set of gains for each color component to the first amplifying unit according to the type of the light source detected by the detecting unit during imaging when the light emitting unit emits light;
   a control unit configured to supply the image signal amplified by the first amplifying unit to which the set of gains is set by the first setting unit to a recording device;
   a first set gain storage unit configured to store sets of gains for each color component corresponding to each type of the light source for establishing a white balance during light emission of the light emitting unit;
   a second amplifying unit configured to amplify the image signal output from the image pickup device for each color component; and
   a second setting unit configured to sequentially set a different one of the sets of gains to the second amplifying unit for each color component every time the image signal is output from the image pickup device when the light emitting unit does not emit light; and
   wherein the detecting unit detects the type of the light source based on the color components of the image signal amplified by the second amplifying unit to which the sequentially set sets of gains are set by the second setting unit; and
   wherein the first setting unit reads out one of the sets of gains corresponding to the type of the light source detected by the detecting unit from the first set gain storage unit, and sets the read-out set of gains to the first amplifying unit.

2. The image pickup apparatus according to claim 1, further comprising:
   a counting unit which counts a number of pixels corresponding to a color range of white of the image signal which is amplified by the second amplifying unit each time the image signal is output from the image pickup device; and
   wherein the detecting unit detects an image signal of which the counted number of pixels is maximum when a predetermined number of frames of the image signal are output from the image pickup device, and detects the type of the light source based on a given one of the sets of gains of the second amplifying unit which amplifies the image signal of which the counted number of pixels is maximum.

3. The image pickup apparatus according to claim 2, further comprising:
   a second set gain storage unit which stores sets of gains for each color component corresponding to each type of light source for establishing a white balance during light non-emission of the light emitting unit;
   wherein the second setting unit sequentially reads out plural sets of gains corresponding to each type of the light source from the second set gain storage unit, and sequentially sets the read-out sets of gains to the second amplifying unit each time the image signal is output from the image pickup device; and
   wherein the detecting unit detects an image signal of which the counted number of pixels is maximum when the predetermined number of frames of the image signal are output from the image pickup device, and detects the type of the light source based on a given one of the sets of gains of the second amplifying unit which amplifies the image signal of which the counted number of pixels is maximum.

4. The image pickup apparatus according to claim 1, further comprising:

a display control unit which displays an image based on the image signal which is amplified by the second amplifying unit.

5. An image pickup apparatus comprising:
an image pickup device configured to pick up an image of an object and output an image signal having color components;
a light emitting unit configured to emit light;
an amplifying unit configured to amplify the image signal output from the image pickup device for each color component;
a detecting unit configured to detect a type of a light source when the light emitting unit does not emit light based on the color components of the image signal;
a setting unit configured to set a set of gains for each color component to the amplifying unit according to the type of the light source detected by the detecting unit during imaging when the light emitting unit emits light;
a control unit configured to supply the image signal amplified by the amplifying unit to which the set of gains is set by the setting unit to a recording device;
a set gain storage unit configured to store sets of gains for each color component corresponding to each type of the light source for establishing a white balance during light emission of the light emitting unit; and
an exposure calculating unit configured to calculate an exposure value;
wherein the setting unit reads out one of the sets of gains corresponding to the type of the light source detected by the detecting unit from the set gain storage unit, and sets the read-out set of gains to the amplifying unit;
wherein the set gain storage unit stores the sets of gains for each color component which correspond to respective combinations of each type of the light source and each exposure value; and
wherein the setting unit reads out the one of the sets of gains as corresponding to a given combination of the type of the light source detected by the detecting unit and the exposure value calculated by the exposure calculating unit from the set gain storage unit.

6. A white balance control method for an image pickup apparatus which comprises an image pickup device configured to pick up an image of an object and output an image signal having color components, a light emitting unit configured to emit light, a first amplifying unit configured to amplify the image signal output from the image pickup device for each color component, a second amplifying unit configured to amplify the image signal output from the image pickup device for each color component, and a set gain storage unit configured to store sets of gains for each color component corresponding to each type of a light source for establishing a white balance during light emission of the light emitting unit, the method comprising:
sequentially setting a different one of the sets of gains to the second amplifying unit for each color component every time the image signal is output from the image pickup device when the light emitting unit does not emit light;
detecting a type of the light source when the light emitting unit does not emit light based on the color components of the image signal;
setting a set of gains for each color component to the first amplifying unit according to the detected type of the light source during imaging when the light emitting unit emits light; and
supplying the image signal amplified by the first amplifying unit to which the set of gains is set, to a recording device, wherein the type of the light source is detected based on the color components of the image signal amplified by the second amplifying unit to which the sequentially set sets of gains are set by the sequential setting, and
wherein the setting of the set of gains for each color component to the first amplifying unit comprises reading out one of the sets of gains corresponding to the detected type of the light source from the set gain storage unit, and setting the read out set of gains to the first amplifying unit.

7. A white balance control method for an image pickup apparatus which comprises an image pickup device configured to pick up an image of an object and output an image signal having color components, a light emitting unit configured to emit light, an amplifying unit configured to amplify the image signal output from the image pickup device for each color component, and a set gain storage unit configured to store sets of gains for each color component corresponding to each type of a light source for establishing a white balance during light emission of the light emitting unit, the method comprising:
detecting a type of the light source when the light emitting unit does not emit light based on the color components of the image signal;
setting a set of gains for each color component to the amplifying unit according to the detected type of the light source during imaging when the light emitting unit emits light;
supplying the image signal amplified by the amplifying unit to which the set of gains is set, to a recording device; and
calculating an exposure value;
wherein the setting of the set of gains for each color component to the amplifying unit comprises reading out one of the sets of gains corresponding to the detected type of the light source from the set gain storage unit, and setting the read-out set of gains to the amplifying unit,
wherein the set gain storage unit stores the sets of gains for each color component which correspond to respective combinations of each type of the light source and each exposure value; and
wherein the read-out set of gains corresponds to a given combination of the detected type of the light source and the calculated exposure value.

8. A computer-readable storage medium having a white balance control program stored thereon that is executable by an image pickup apparatus which comprises an image pickup device configured to pick up an image of an object and output an image signal having color components, a light emitting unit configured to emit light, a first amplifying unit configured to amplify the image signal output from the image pickup device for each color component, a second amplifying unit configured to amplify the image signal output from the image pickup device for each color component, and a set gain storage unit configured to store sets of gains for each color component corresponding to each type of a light source for establishing a white balance during light emission of the light emitting unit, the program being executable by the image pickup apparatus to perform functions comprising:
sequentially setting a different one of the sets of gains to the second amplifying unit for each color component every time the image signal is output from the image pickup device when the light emitting unit does not emit light;
detecting a type of the light source when the light emitting unit does not emit light based on the color components of the image signal;

setting a set of gains for each color component to the first amplifying unit according to the detected type of the light source during imaging when the light emitting unit emits light; and supplying the image signal amplified by the first amplifying unit to which the set of gains is set, to a recording device, wherein the type of the light source is detected based on the color components of the image signal amplified by the second amplifying unit to which the sequentially set sets of gains are set by the sequential setting, and wherein the setting of the set of gains for each color component to the first amplifying unit comprises reading out one of the sets of gains corresponding to the detected type of the light source from the set gain storage unit, and setting the read out set of gains to the first amplifying unit.

9. A computer-readable storage medium having a white balance control program stored thereon that is executable by an image pickup apparatus which comprises an image pickup device configured to pick up an image of an object and output an image signal having color components, a light emitting unit configured to emit light, an amplifying unit configured to amplify the image signal output from the image pickup device for each color component, and a set gain storage unit configured to store sets of gains for each color component corresponding to each type of a light source for establishing a white balance during light emission of the light emitting unit, the program being executable by the image pickup apparatus to perform functions comprising:

detecting a type of the light source when the light emitting unit does not emit light based on the color components of the image signal;

setting a set of gains for each color component to the amplifying unit according to the detected type of the light source during imaging when the light emitting unit emits light;

supplying the image signal amplified by the amplifying unit to which the set of gains is set, to a recording device; and calculating an exposure value;

wherein the setting of the set of gains for each color component to the amplifying unit comprises reading out one of the sets of gains corresponding to the detected type of the light source from the set gain storage unit, and setting the read-out set of gains to the amplifying unit, wherein the set gain storage unit stores the sets of gains for each color component which correspond to respective combinations of each type of the light source and each exposure value; and wherein the read-out set of gains corresponds to a given combination of the detected type of the light source and the calculated exposure value.

* * * * *